(12) United States Patent
Matsuda et al.

(10) Patent No.: US 11,262,503 B2
(45) Date of Patent: Mar. 1, 2022

(54) FIBER CUTTER

(71) Applicants: Fujikura Ltd., Tokyo (JP); NIPPON TELEGRAPH AND TELEPHONE CORPORATION, Tokyo (JP)

(72) Inventors: Takaharu Matsuda, Sakura (JP); Kunihiko Fujiwara, Sakura (JP); Ryo Koyama, Musashino (JP); Mitsuru Kihara, Musashino (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/497,307

(22) PCT Filed: May 7, 2018

(86) PCT No.: PCT/JP2018/017597
§ 371 (c)(1),
(2) Date: Sep. 24, 2019

(87) PCT Pub. No.: WO2018/212004
PCT Pub. Date: Nov. 22, 2018

(65) Prior Publication Data
US 2020/0103592 A1 Apr. 2, 2020

(30) Foreign Application Priority Data
May 15, 2017 (JP) .............................. JP2017-096215

(51) Int. Cl.
*G02B 6/25* (2006.01)
*B26D 7/14* (2006.01)
*B26F 3/00* (2006.01)

(52) U.S. Cl.
CPC ............... *G02B 6/25* (2013.01); *B26D 7/14* (2013.01); *B26F 3/002* (2013.01); *Y10T 225/321* (2015.04); *Y10T 225/357* (2015.04)

(58) Field of Classification Search
CPC .. B26D 7/14; B26F 3/002; G02B 6/25; Y10T 225/12; Y10T 225/321; Y10T 225/325; Y10T 225/357
(Continued)

(56) References Cited

U.S. PATENT DOCUMENTS 4,074,840 A * 2/1978 Fulenwider et al. ... B26F 3/002
225/96.5
4,154,385 A * 5/1979 Lewis .................... B26F 3/002
225/2
(Continued)

FOREIGN PATENT DOCUMENTS

| CN | 1348549 A | 5/2002 |
|---|---|---|
| CN | 102107331 A | 6/2011 |

(Continued)

*Primary Examiner* — Clark F Dexter
(74) *Attorney, Agent, or Firm* — Osha Bergman Watanabe & Burton LLP

(57) ABSTRACT

A fiber cutter includes: a base including a fiber grip that grips an optical fiber; a slider including a fiber end grip that grips an end portion of the optical fiber, wherein the slider moves relative to the base; a cut former including a blade forming an initial cut in the optical fiber and disposed between the fiber grip and the fiber end grip; and a spring that applies a force between the base and the slider to apply a tension to the optical fiber gripped by the fiber grip and the fiber end grip, wherein the cut former is disposed on the slide, and when the initial cut grows and the optical fiber cleaves, the cut former moves together with the slider by the force of the spring.

6 Claims, 6 Drawing Sheets

(58) Field of Classification Search
USPC .................................. 225/2, 96, 96.5, 101
See application file for complete search history.

(56) References Cited

U.S. PATENT DOCUMENTS

| | | | | |
|---|---|---|---|---|
| 4,473,942 | A | | 10/1984 | Ridgway |
| 4,502,620 | A | * | 3/1985 | Leiby ................ G02B 6/25 225/101 |
| 4,530,452 | A | * | 7/1985 | Balyasny et al. ........ G02B 6/25 225/101 |
| 4,552,290 | A | * | 11/1985 | Szostak ................ G02B 6/25 225/101 |
| 4,621,754 | A | * | 11/1986 | Long et al. ............ G02B 6/25 225/2 |
| 4,627,561 | A | * | 12/1986 | Balyasny et al. .... G02B 6/3841 225/96 |
| 4,674,666 | A | * | 6/1987 | Balyasny ................ G02B 6/25 225/101 |
| 5,829,659 | A | * | 11/1998 | Mansfield et al. ....... G02B 6/25 225/2 |
| 2002/0130152 | A1 | | 9/2002 | Cripps |
| 2003/0077062 | A1 | * | 4/2003 | Sasaki et al. ............ G02B 6/25 385/134 |
| 2005/0220428 | A1 | | 10/2005 | Bottcher |
| 2010/0163593 | A1 | * | 7/2010 | Song et al. ............... G02B 6/25 225/96 |

FOREIGN PATENT DOCUMENTS

| | | |
|---|---|---|
| CN | 102736179 A | 10/2012 |
| CN | 202710784 U | 1/2013 |
| CN | 202837588 U | 3/2013 |
| CN | 106338796 A | 1/2017 |
| CN | 206074853 U | 4/2017 |
| CN | 106646745 A | 5/2017 |
| JP | S59-500686 A | 4/1984 |
| JP | S62-70803 A | 4/1987 |
| JP | S62194204 A | 8/1987 |
| JP | H07-80798 A | 3/1995 |
| JP | 2004233417 A | 8/2004 |
| JP | 2009103813 A | 5/2009 |
| JP | 2014238574 A | 12/2014 |

* cited by examiner

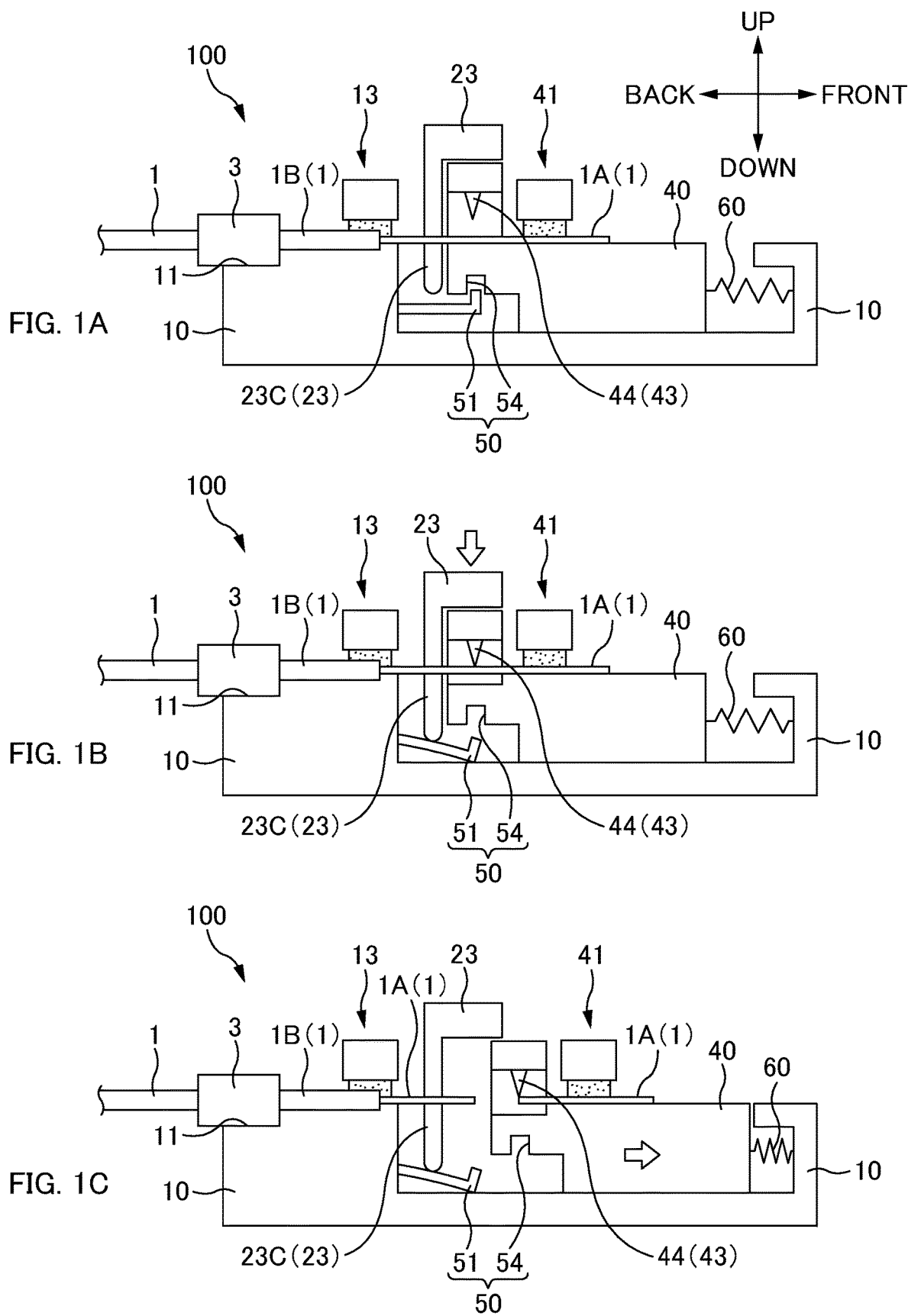

FIBER CUTTER

TECHNICAL FIELD

The present invention relates to a fiber cutter.

BACKGROUND

In general, a fiber cutter for cutting an optical fiber forms an initial cut in an optical fiber by a blade and makes this initial cut grow, so that the optical fiber cleaves, to consequently cut the optical fiber (refer, for example, to Patent Literatures 1 and 2).

PATENT LITERATURE

Patent Literature 1: JP S62-194204A
Patent Literature 2: JP 2014-238574A

After forming an initial cut in an optical fiber by a blade and cleaving the optical fiber, if a cut surface of the optical fiber and the blade come in contact with each other at the time of removing the optical fiber from a fiber cutter, the cut surface may become dirty.

SUMMARY

One or more embodiments of the present invention suppress contact of a cut surface of an optical fiber and a blade after cleavage of the optical fiber.

One or more embodiments of the present invention provide a fiber cutter comprising: a base member that includes a fiber grip for gripping an optical fiber; a slide member that includes a fiber end grip for gripping an end portion of the optical fiber, the slide member being movable relative to the base member; a cut forming section that includes a blade for forming an initial cut in the optical fiber between the fiber grip and the fiber end grip; and a tension application section that applies force between the base member and the slide member to apply tension to the optical fiber gripped by the fiber grip and the fiber end grip, wherein the cut forming section is provided to the slide member, and when the initial cut formed by the blade grows and the optical fiber cleaves, the cut forming section moves together with the slide member by the force of the tension application section.

Other features of one or more embodiments of the present invention are made clear by the following description and the drawings.

According to one or more embodiments of the present invention, it is possible to suppress contact of a cut surface of an optical fiber and a blade after cleavage of the optical fiber.

BRIEF DESCRIPTION OF DRAWINGS

FIGS. 1A to 1C are schematic explanatory diagrams illustrating a fiber cutter 100 according to one or more embodiments of the present invention.

DETAILED DESCRIPTION

Figure 2A:
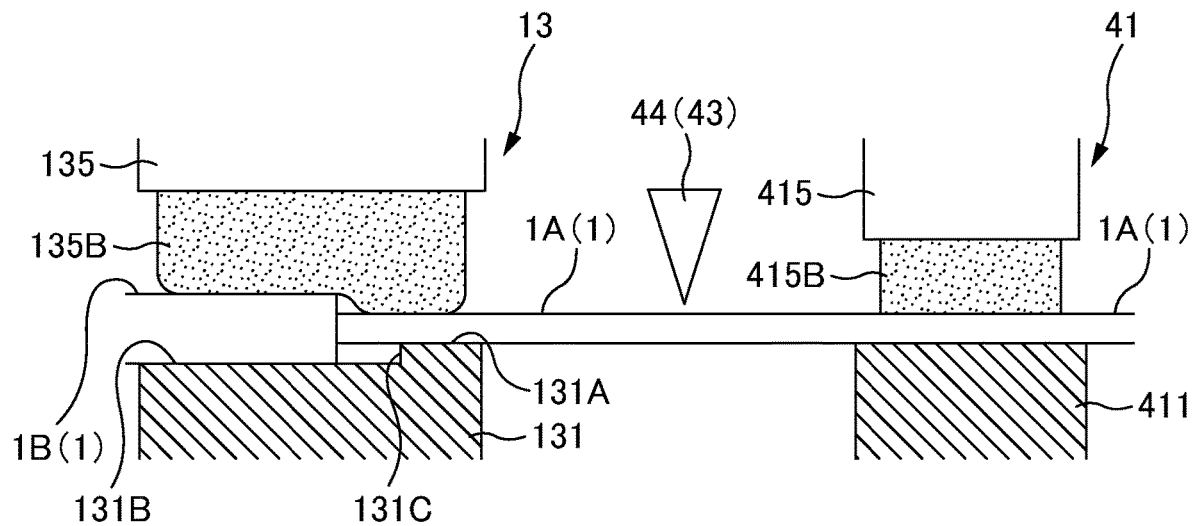
FIG. 2A is a schematic explanatory diagram illustrating a state of gripping an optical fiber 1 according to one or more embodiments of the present invention.

At least the following matters are made clear from the following description and the drawings.

A fiber cutter will become clear, comprising: a base member that includes a fiber grip for gripping an optical fiber; a slide member that includes a fiber end grip for gripping an end portion of the optical fiber, the slide member being movable relative to the base member; a cut forming section that includes a blade for forming an initial cut in the optical fiber between the fiber grip and the fiber end grip; and a tension application section that applies force between the base member and the slide member to apply tension to the optical fiber gripped by the fiber grip and the fiber end grip, wherein the cut forming section is provided to the slide member, and when the initial cut formed by the blade grows and the optical fiber cleaves, the cut forming section moves together with the slide member by the force of the tension application section. With this fiber cutter, it is possible to suppress contact of the cut surface of the optical fiber and the blade after cleavage of the optical fiber.

The base member includes an operation section that operates the cut forming section; and the cut forming section is configured to be movable relative to the operation section. In this way, operability of the fiber cutter is improved.

A latch section is formed in the base member and the slide member; the operation section includes a latch release section that releases a latch state of the latch section; and when the cut forming section is operated by the operation section in a direction of forming the initial cut in the optical fiber, the latch state of the latch section is released by the latch release section, and the tension is applied to the optical fiber by the tension application section. In this way, operability of the fiber cutter is improved.

The fiber cutter comprises a restriction section that restricts the fiber end grip gripping the end portion of the optical fiber before the fiber grip grips the optical fiber. In this way, it is possible to suppress torsion stress being applied to the optical fiber and suppress the cut surface of the optical fiber being inclined.

When the fiber grip grips the optical fiber, the fiber grip comes into contact with the restriction section to move the restriction section, and restriction on the fiber end grip by the restriction section is released. In this way, operability is improved.

The cut forming section includes a positioning section that performs positioning with respect to a reference surface of the base member. In this way, it is possible to align the movable cut-forming section with the predetermined position.

The positioning section includes a protrusion; a first space through which the protrusion is not able to pass and a second space through which the protrusion is able to pass are formed in the reference surface of the base member; when the protrusion is positioned in the first space, the protrusion is in contact with the reference surface to position the cut forming section with respect to the base member; and when the protrusion is positioned in the second space, the protrusion passes through the second space, and the cut forming section moves together with the slide member. In this way, it is possible to perform positioning of the cut forming section before cutting of the optical fiber and also to configure the cut forming section to be movable after cutting of the optical fiber.

Overview:

FIGS. 1A to 1C are schematic explanatory diagrams illustrating a fiber cutter 100 according to one or more embodiments of the present invention.

In the following description, directions will be defined as illustrated in FIG. 1A. Specifically, a direction parallel to an optical axis of an optical fiber 1 is a "front-rear direction", a side of an endface of the optical fiber 1 is "front", and an opposite side is "rear". Further, a direction perpendicular to a placing surface on which a holder 3 is placed is an "up-down direction", a side on which the holder 3 is when seen from the placing surface is "up", and an opposite side is "down".

The fiber cutter 100 is a cutting device for cutting the optical fiber 1. Specifically, the fiber cutter 100 is a device that forms an initial cut in the optical fiber 1 by a blade 44 and makes this initial cut grow, so that the optical fiber 1 cleaves, to consequently cut the optical fiber 1.

The fiber cutter 100 includes a base member (base) 10 and a slide member (slider) 40. The base member 10 includes a holder placing section 11 and a fiber grip 13. The slide member 40 is a member that is movable relative to the base member 10 and includes a fiber end grip 41 and a cut forming section (cut former) 43. The cut forming section 43 is arranged or disposed between the fiber grip 13 and the fiber end grip 41 and includes the blade 44 that forms an initial cut in the optical fiber 1. Between the base member 10 and the slide member 40, a tension application spring 60 is arranged. The tension application spring 60 is a member that applies force between the base member 10 and the slide member 40 (tension application section; spring) and applies tension to the optical fiber 1 gripped by the fiber grip 13 and the fiber end grip 41.

As illustrated in FIG. 1A, the optical fiber 1 to be cut is placed on the fiber cutter 100 in a state of being held by the holder 3. The optical fiber 1 is gripped by the fiber grip 13 and the fiber end grip 41 in a state of being bridged from the fiber grip 13 of the base member 10 to the fiber end grip 41 of the slide member 40.

As illustrated in FIG. 1B, the operation section (operation unit) 23 is a pressing body 23, and when the operation section (operation unit) 23 is pressed, a latch release section (latch releaser) 23C of the operation section 23 releases a latch section (latch unit) 50. When the latch section 50 is released, the slide member 40 is pulled toward the right side of the drawing by force of the tension application spring 60, to thereby apply tension to the optical fiber 1. In addition, when the operation section 23 is pressed, the blade 44 of the cut forming section 43 forms an initial cut in a side surface of the optical fiber 1.

When the initial cut is formed in the optical fiber 1 with the tension being applied, the initial cut grows, so that the optical fiber 1 cleaves, and consequently the optical fiber 1 is cut. The initial cut growing to cleave the optical fiber 1 allows a mirror-surface-like cut surface to be obtained.

As illustrated in FIG. 1C, when the optical fiber 1 is cut, the slide member 40 moves by the force of the tension application spring 60. Since the cut forming section 43 is provided to the slide member 40 in one or more embodiments of the present invention, the cut forming section 43 moves together with the slide member 40 as the optical fiber 1 cleaves. In this way, it is possible to suppress contact of the cut surface of the optical fiber 1 and the blade 44 at the time when the optical fiber 1 gripped by the base member 10 is removed after cutting. Note that, since the optical fiber 1 gripped by the slide member 40 is a portion to be discarded after cutting of the optical fiber 1, this cut surface of the optical fiber 1 is allowed to come into contact with the blade 44 after the cutting.

FIG. 2A is a schematic explanatory diagram illustrating a state of gripping the optical fiber 1 according to one or more embodiments of the present invention.

In one or more embodiments of the present invention, the fiber grip 13 (and the fiber end grip 41) grips a portion of a bare optical fiber 1A with a sheath removed, and the optical fiber 1 (bare optical fiber 1A) is cut therebetween. Specifically, in one or more embodiments of the present invention, the bare optical fiber 1A is directly gripped at both front and rear sides of the bare optical fiber 1A to be cut. Note that, if the fiber grip 13 grips the optical fiber 1 without directly gripping the bare optical fiber 1A, the bare optical fiber 1A is in a state of being indirectly gripped by the fiber grip 13 via a sheath part 1B. As a result of this, the optical fiber 1 may vary in the manner of deformation at the time of cutting depending on the difference in properties of the sheath part 1B (e.g., hardness of the sheath part 1B), and this consequently may cause the cut surface of the optical fiber 1 after cutting to vary according to the properties of the sheath part 1B. In particular, since the sheath part 1B of the optical fiber 1 may vary in properties according to the manufacturer of the optical fiber 1, the cut surface of the optical fiber 1 may vary according to the manufacturer of the optical fiber 1 if the bare optical fiber 1A is cut in a state where the fiber grip 13 indirectly grips the bare optical fiber 1A via the sheath part 1B. In contrast to this, in a case that the fiber grip 13 directly grips the bare optical fiber 1A as in one or more embodiments of the present invention, the fiber grip 13 can grip the bare optical fiber 1A without being affected by the properties of the sheath part 1B, and hence the cut surface of the optical fiber 1 need not be affected by the properties of the sheath part 1B.

Figure 2B:
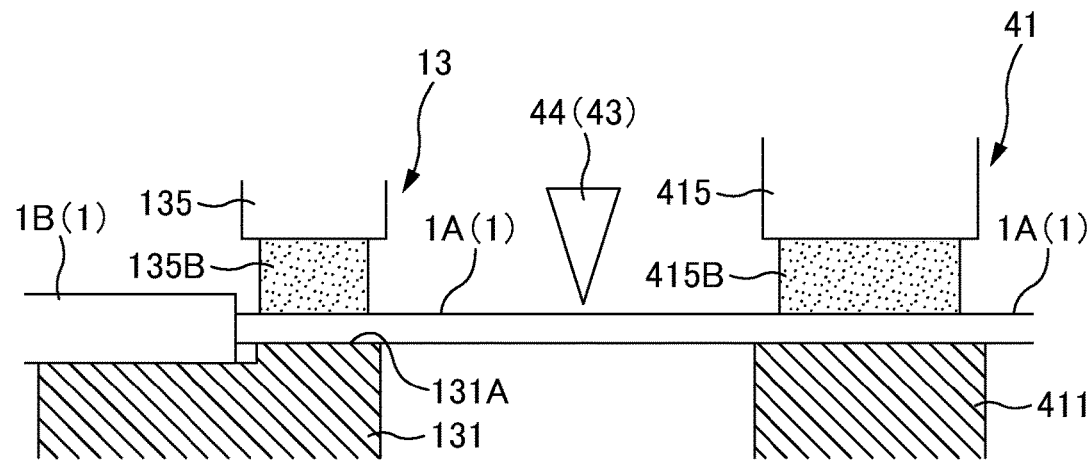
FIG. 2B is a schematic explanatory diagram illustrating a state of gripping the optical fiber 1 according to one or more embodiments of the present invention.

Note that, in one or more embodiments of the present invention, the fiber grip 13 grips not only the bare optical fiber 1A but also the portion rear of the bare optical fiber 1A, the portion including the sheath part 1B, as illustrated in FIG. 2A. In other words, in one or more embodiments of the present invention, the fiber grip 13 grips portions front and rear of an edge where the sheath of the optical fiber 1 is removed (stripping edge). In this way, the fiber grip 13 can directly grip the bare optical fiber 1A while the length of the portion of the optical fiber 1 being gripped can be secured. Note that, however, as long as the length of the portion of the optical fiber being gripped is sufficient, the fiber grip 13 may grip only the bare optical fiber 1A as illustrated in FIG. 2B.

Figure 3:
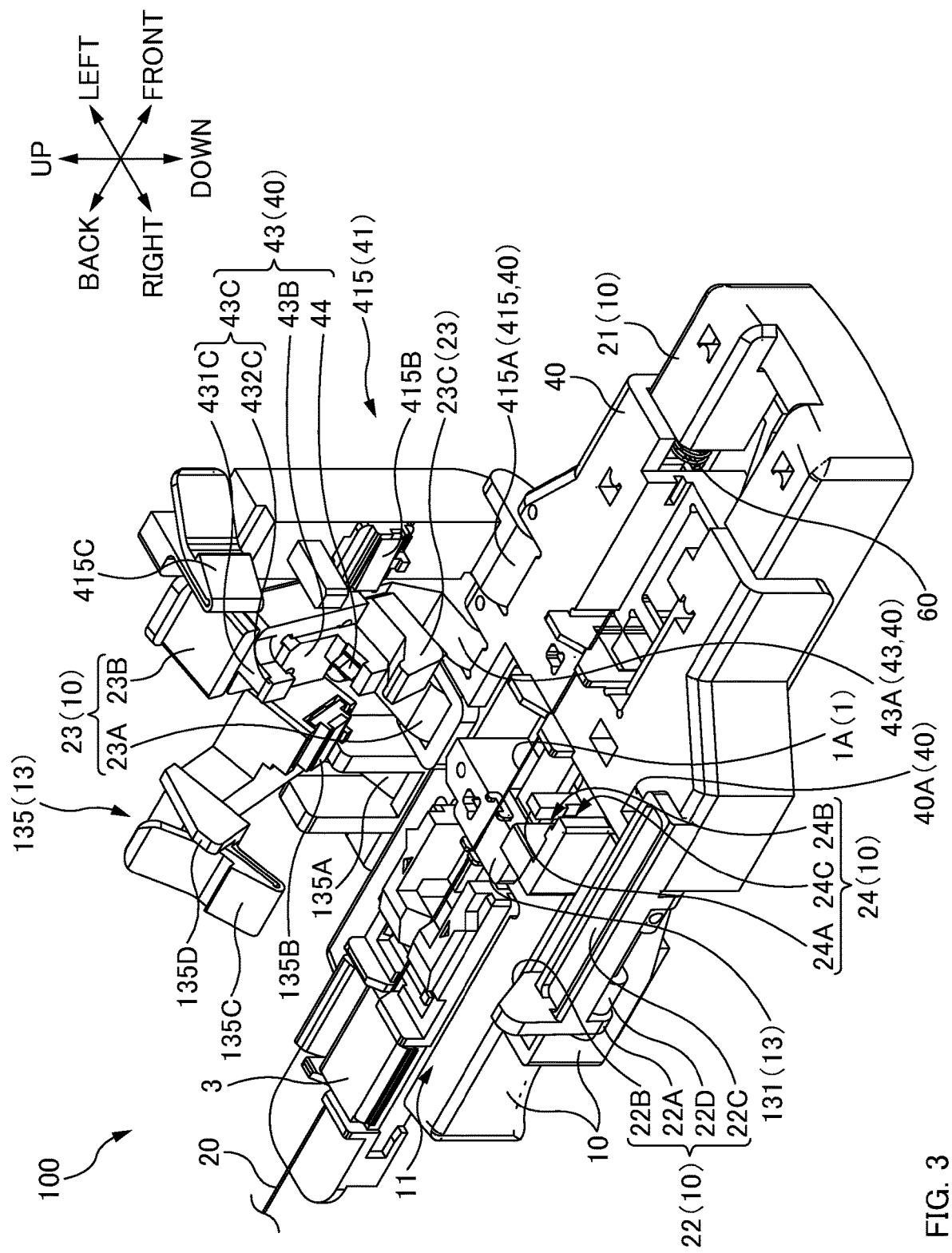
FIG. 3 is a perspective view of the entire fiber cutter 100 according to one or more embodiments of the present invention.

Structure of Fiber Cutter 100:

FIG. 3 is a perspective view of the entire fiber cutter 100 according to one or more embodiments of the present invention. FIGS. 4A to 4D are explanatory diagrams illustrating states of the fiber cutter 100 according to one or more embodiments of the present invention. As has already been described, the fiber cutter 100 includes the base member 10 and the slide member 40.

As has already been described, the base member 10 includes the holder placing section 11 and the fiber grip 13.

The holder placing section 11 is a section on which the holder 3 is placed. A bottom surface of the holder placing section 11 serves as a holder placing surface. The holder placing section 11 is provided in a rear portion of the base member 10.

The fiber grip 13 is a member that grips the optical fiber 1. In one or more embodiments of the present invention, the fiber grip 13 grips the optical fiber 1 held by the holder 3. However, the fiber grip 13 may grip the optical fiber 1 in a state of not being held by the holder 3. The fiber grip 13 is positioned on a front side of the holder placing section 11. The fiber grip 13 is arranged between the holder placing section 11 and the operation section 23 (or the cut forming section 43) in the front-rear direction. The fiber grip 13 includes a fiber placing stage 131 and a fiber gripper 135.

Figure 5:
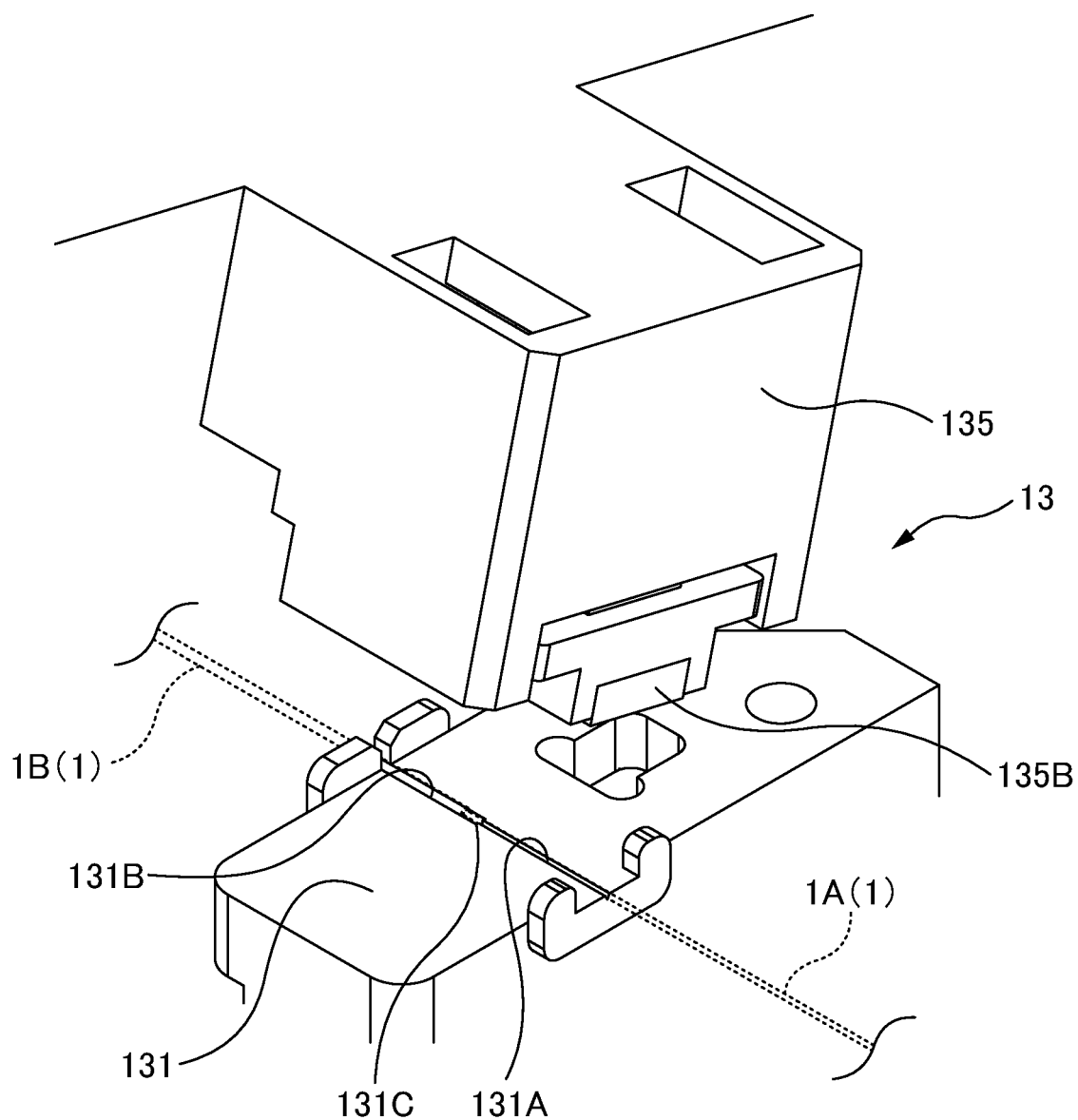
FIG. 5 is a perspective view of a fiber placing stage 131 and a fiber holding section 135B of a fiber gripper 135 according to one or more embodiments of the present invention.

FIG. 5 is a perspective view of the fiber placing stage 131 (and a fiber holding section 135B of the fiber gripper 135). In the drawing, the optical fiber 1 placed on the fiber placing stage 131 is illustrated by dotted lines.

The fiber grip 131 is a section on which the optical fiber 1 is placed (placing stage). The fiber placing stage 131 of one or more embodiments of the present invention includes a bare optical fiber placing section 131A and a sheath placing section 131B. The bare optical fiber placing section 131A is a section on which the bare optical fiber 1A with the sheath removed is placed (placing stage). The bare optical fiber placing section 131A is formed in a V-groove shape in the front-rear direction, and the groove is formed to have a depth corresponding to the diameter of the bare optical fiber 1A (125 μm). The sheath placing section 131B is a section on which the optical fiber 1 including the sheath part 1B covering the bare optical fiber 1A is placed (placing stage). The sheath placing section 131B is formed in a V-groove shape in the front-rear direction, and the groove is formed to have a depth corresponding to the diameter of the optical fiber 1 including the sheath part 1B (250 μm). The bare optical fiber placing section 131A and the sheath placing section 131B are formed contiguous with each other in the front-rear direction but have V grooves different in depth. Hence, a step section 131C is formed between the bare optical fiber placing section 131A and the sheath placing section 131B. As illustrated by dotted lines in FIG. 5, the optical fiber 1 is placed on the fiber placing stage 131 so that the bare optical fiber 1A is placed on the bare optical fiber placing section 131A and the portion of the optical fiber 1 including the sheath part 1B is placed on the sheath placing section 131B. In other words, the portions front and rear of the edge where the sheath of the optical fiber 1 is removed (stripping edge), are placed on the fiber placing stage 131.

The fiber gripper 135 is a member that grips the optical fiber 1 with the fiber placing stage 131. In one or more embodiments of the present invention, the fiber gripper 135 is provided to be openable and closable with respect to a body of the base member 10 and includes a hinge section 135A, the fiber holding section 135B, and an anchor claw section 135C (refer to FIG. 3). The hinge section 135A is a coupling section that rotatably couples the fiber gripper 135 with the body of the base member 10. The fiber holding section 135B is a member that comes into contact with the optical fiber 1 placed on the fiber placing stage 131 to hold the optical fiber 1 with the fiber placing stage 131. The anchor claw section 135C is an anchor section that anchors to the body of the base member 10 and is a section that fixes the fiber gripper 135 in a closed state. The anchor claw section 135C being anchored to an engagement hole of the body of the base member 10 to fix the fiber gripper 135 in the closed state allows the optical fiber 1 to be gripped between the fiber placing stage 131 and the fiber holding section 135B.

In one or more embodiments of the present invention, the fiber holding section 135B is provided to be able to face the bare optical fiber placing section 131A (and the sheath placing section 131B) of the fiber placing stage 131. With this, the fiber grip 13 can grip the bare optical fiber 1A with the sheath removed. Moreover, in one or more embodiments of the present invention, the fiber holding section 135B is provided to be able to face not only the bare optical fiber placing section 131A but also the sheath placing section 131B. With this, the fiber grip 13 can grip portions front and rear of the edge where the sheath of the optical fiber 1 is removed (stripping edge).

In one or more embodiments of the present invention, the fiber holding section 135B is made of a flexible resin material to be able to come into contact with the portions front and rear of the edge where the sheath of the optical fiber 1 is removed (stripping edge) (refer to FIG. 2A). The fiber holding section 135B being configured with a flexible member allows a contact surface of the fiber holding section 135B to be deformable, which enables the fiber holding section 135B to be able to hold, with the fiber placing stage 131, the portions front and rear of the edge where the sheath of the optical fiber 1 is removed (stripping edge).

The fiber gripper 135 of one or more embodiments of the present invention includes a contact section 135D. The contact section 135D is a section that comes into contact with a restriction section (restriction unit) 22 to rotate the restriction section 22. The restriction section 22 will be described later.

The base member 10 includes, in addition to the above, a slide guide section 21, the restriction section 22, the operation section 23, and a positioning section (positioner) 24.

The slide guide section 21 is a section that movably guides the slide member 40 in the front-rear direction. The slide guide section 21 is arranged in a front side of the base member 10.

The restriction section 22 is a member that restricts the fiber end grip 41 gripping the end portion (bare optical fiber 1A) of the optical fiber 1. The restriction section 22 includes a hinge section 22A, a contacted section 22B, a restriction lid 22C, and a torsion spring 22D. The hinge section 22A is a coupling section that rotatably couples the restriction section 22 with the body of the base member 10. The contacted section 22B is a section that comes into contact with the contact section 135D of the fiber gripper 135. When the anchor claw section 135C of the fiber gripper 135 is engaged with the engagement hole of the body of the base member 10 to fix the fiber gripper 135 in a closed state, the contact section 135D of the fiber gripper 135 comes into contact with the contacted section 22B of the restriction section 22, which consequently rotates the restriction section 22 (refer to FIG. 4A). The restriction lid 22C is a section that closes an engagement hole 40A of the slide member 40. In a state where the fiber gripper 135 is opened (refer to FIG. 3), the restriction lid 22C is in a state of closing the engagement hole 40A of the slide member 40 to restrict a catch pawl 415C of the fiber end grip 41 being engaged with the engagement hole 40A of the slide member 40 (thereby, restricting the fiber end grip 41 gripping the end portion of the optical fiber 1). In contrast, in a state where the fiber gripper 135 is closed (refer to FIGS. 4A and 4B), the restriction lid 22C allows the engagement hole 40A of the slide member 40 to be opened and the catch pawl 415C of the fiber end grip 41 to be caught at the engagement hole 40A of the slide member 40 (releasing the restriction on the fiber end grip 41 by the restriction section 22). The torsion spring 22D is a member that holds the restriction section 22 at an initial position so that the restriction lid 22C closes the engagement hole 40A of the slide member 40 when the contacted section 22B is in a non-contacted state.

In one or more embodiments of the present invention, the restriction section 22 being provided can restrict the fiber end grip 41 gripping the end portion of the optical fiber 1 before the fiber grip 13 grips the optical fiber 1. Note that, if the fiber end grip 41 grips the optical fiber 1 before the fiber grip 13 grips the optical fiber 1, torsion stress is applied to the optical fiber 1 when the fiber gripper 135 is rotated to grip the optical fiber 1, which may cause, if the optical fiber 1 is cut in this state, the cut surface to be inclined. In contrast to this, in one or more embodiments of the present invention, it is possible to prevent torsion stress from being applied to the optical fiber 1 since the restriction section 22 is provided and to thereby prevent the cut surface from being inclined.

In one or more embodiments of the present invention, when the fiber grip 13 is closed (the fiber grip 13 grips the optical fiber 1), the restriction section 22 comes into contact with the fiber grip 13 and thereby rotates, to consequently release the restriction on the fiber end grip 41 by the restriction section 22 and allow the fiber end grip 41 to enter a state of being able to grip the end portion of the optical fiber 1. In this way, only by performing a series of operations on the fiber grip 13, it is possible to cause the fiber grip 13 to grip the optical fiber 1 and to release the restriction on the fiber end grip 41 by the restriction section 22, and hence operability is improved. Note that, however, the operation of causing the fiber grip 13 to grip the optical fiber 1 and the operation of releasing the restriction on the fiber end grip 41 by the restriction section 22 may be performed separately.

The operation section 23 is a section that performs an operation of causing the blade 44 to come close to the optical fiber 1 in order to form an initial cut in the optical fiber 1. The operation section 23, as similar to the cut forming section 43, is arranged between the fiber grip 13 and the fiber end grip 41.

The operation section 23 includes a hinge section 23A, a housing section 23B, and a latch release section 23C. The hinge section 23A is a coupling section that rotatably couples the operation section 23 with the body of the base member 10. The housing section 23B is a section that houses therein the cut forming section 43. The housing section 23B houses the cut forming section 43 so that the cut forming section 43 is movable in the front-rear direction to the operation section 23. A pressing section 231B (refer to FIG. 6A) that presses an upper surface of the cut forming section 43 is formed on an upper surface of an inner wall of the housing section 23B. Note that a rotation axis of the operation section 23 is arranged on the same straight line as a rotation axis of the cut forming section 43, and, when the operation section 23 is rotated in the closing direction, the cut forming section 43 also rotates in a closing direction, by the pressing section 231B of the housing section 23B, and consequently the blade 44 of the cut forming section 43 moves in a direction of coming close to the optical fiber 1. The latch release section 23C is a member that releases a latch state of the latch section 50 (a base-side latch section 51 and a slide-side latch section 54). When the operation section 23 is rotated in the closing direction, the latch release section 23C comes into contact with the base-side latch section 51, and the base-side latch section 51 is unlatched from the slide-side latch section 54, to release the latch state.

In one or more embodiments of the present invention, the cut forming section 43 is configured to be movable in the front-rear direction with respect to the operation section 23. With this, even if the cut forming section 43 moves together with the slide member 40 when an operator operates the operation section 23 with his/her finger and the optical fiber 1 cleaves, the force of the move of the cut forming section 43 is not transferred to the finger of the operator, and hence operability is improved. Note that, however, if the force of the movement of the cut forming section 43 is allowed to be transferred to the operator, such a structure that the operator directly operates the cut forming section 43 with his/her finger may be employed without providing the operation section 23.

In one or more embodiments of the present invention, it is configured so that the latch release section 23C of the operation section 23 is able to release the latch state of the latch section 50 through an operation of the cut forming section 43 by the operation section 23 in a direction of forming an initial cut in the optical fiber 1 (closing direction). In this way, only by performing a series of operations on the operation section 23 (here, operations of causing the operation section 23 to rotate in the closing direction), it is possible to form an initial cut in the optical fiber 1 and to apply tension to the optical fiber 1, and hence improve operability. Note that, however, it may be configured so that the latch release section 23C is provided independently of the operation section 23 to perform an operation of forming an initial cut in the optical fiber 1 and an operation of releasing the latch state of the base member 10 and the slide member 40, separately.

The positioning section 24 is a section (base-side positioning section) that performs front-rear direction positioning of the cut forming section 43 (blade 44). In one or more embodiments of the present invention, since the cut forming section 43 is configured to be movable in the front-rear direction, the front-rear direction position of the cut forming section 43 (blade 44) at the time when the blade 44 comes into contact with the optical fiber 1 is aligned with a predetermined position by the positioning section 24 to prevent a position of forming an initial cut in the optical fiber 1 from being shifted in the front-rear direction.

The positioning section 24 includes a reference surface 24A perpendicular to the front-rear direction. This reference surface 24A and a positioning pin 43C (specifically, a protrusion 432C of the positioning pin 43C) of the cut forming section 43 are brought into contact with each other to perform front-rear direction positioning of the cut forming section 43. Such a structure that the positioning section 24 performs positioning of the cut forming section 43 by using the reference surface 24A perpendicular to the front-rear direction allows the cut forming section 43 to move to be opened and closed before and after contact of the blade 44 with the optical fiber 1.

Figure 6A:
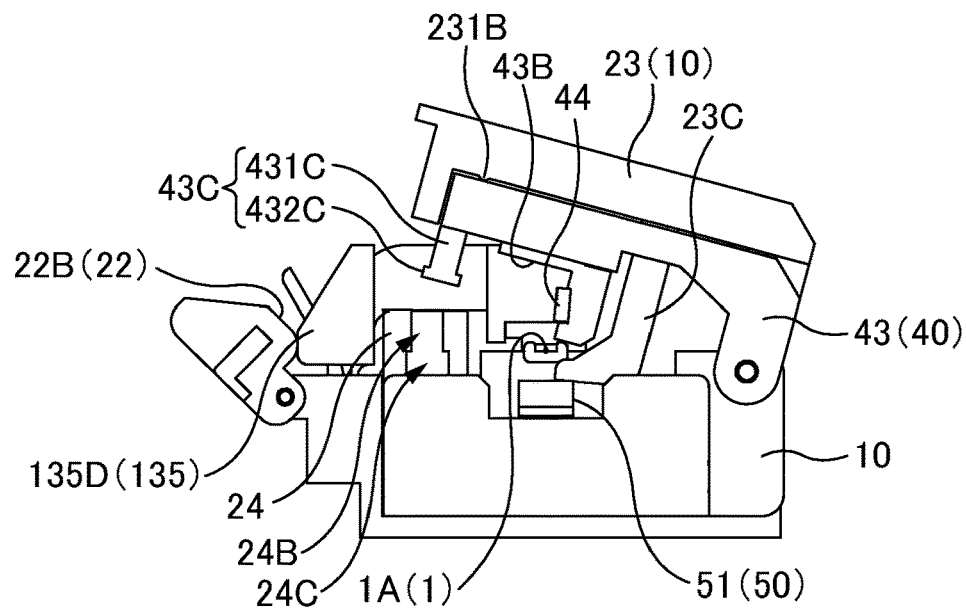
FIGS. 6A to 6C are explanatory diagrams illustrating states at the time when an operation section 23 is closed according to one or more embodiments of the present invention.
Figure 6B:
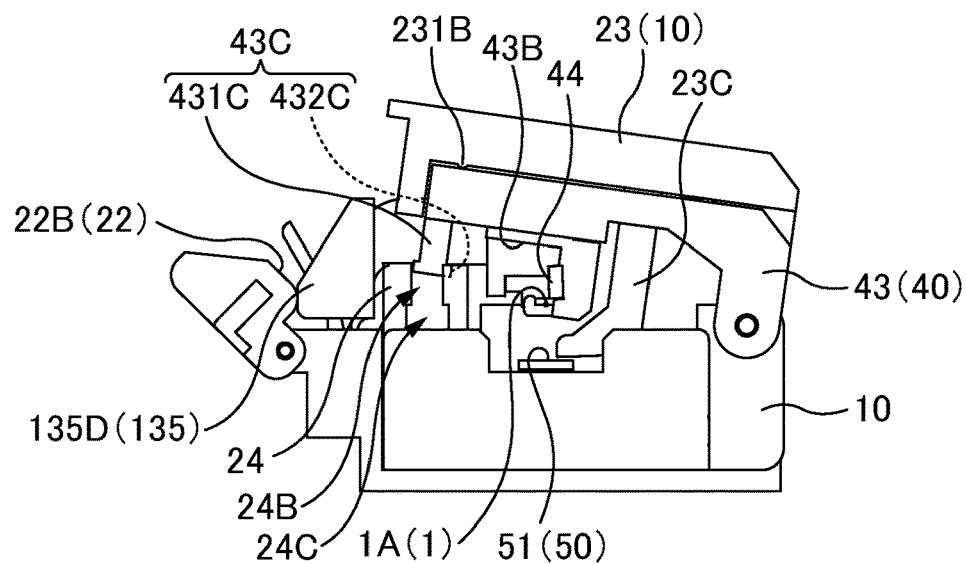
Figure 6C:
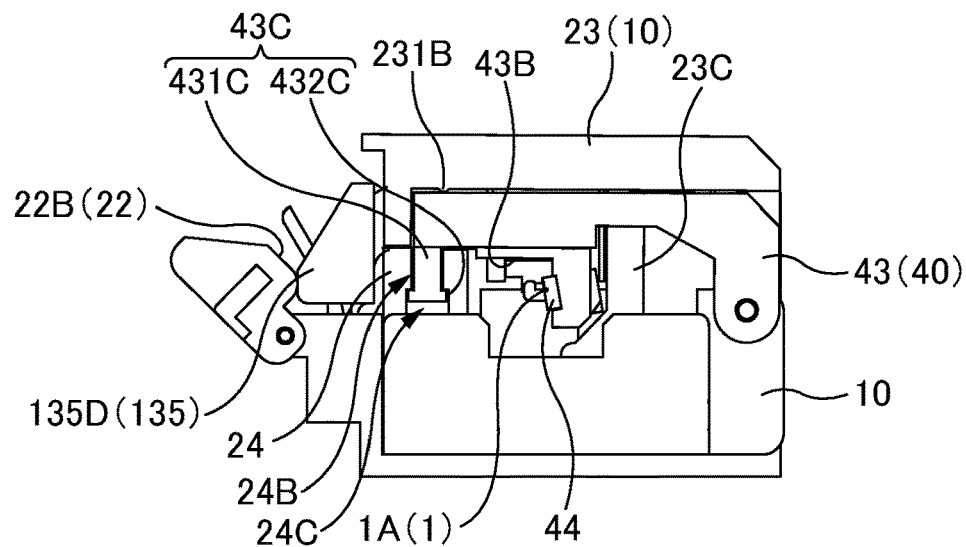

A first space 24B and a second space 24C, through which the positioning pin 43C can pass, are formed in the reference surface 24A of the positioning section 24 (referred to also as FIGS. 6A to 6C). The first space 24B is arranged above the second space 24C. The first space 24B is a space wider than a columnar part 431C of the positioning pin 43C (space through which the columnar part 431C can pass) and is a space narrower than the protrusion 432C of the positioning pin 43C (space through which the protrusion 432C cannot pass). The second space 24C is a space wider than the first space 24B and is a space wider than the protrusion 432C of the positioning pin 43C (space through which the protrusion 432C can pass). As will be described later, when the protrusion 432C of the positioning pin 43C is positioned in the first space 24B (refer to FIG. 6B), the protrusion 432C comes into contact with the reference surface 24A so that the cut forming section 43 is positioned with respect to the base member 10. In contrast to this, when the protrusion 432C of the positioning pin 43C is positioned in the second space 24C (refer to FIG. 6C), the protrusion 432C passes through the second space 24C so that the cut forming section 43 moves together with the slide member 40. With the positioning section 24 thus including the first space 24B and the second space 24C, it is possible to perform positioning of the cut forming section 43 by the reference surface 24A of the positioning section 24 before cutting of the optical fiber 1 and also to move the cut forming section 43 toward a front side after cutting of the optical fiber 1.

The slide member 40 is a member that is movable relative to the base member 10 as has already been described. The slide member 40 is arranged in the front position of the base member 10. As has already been described, the slide member 40 includes the fiber end grip 41 and the cut forming section 43.

The fiber end grip 41 is a member that grips the end portion of the optical fiber 1. The fiber end grip 41 is arranged on a front side of the cut forming section 43. The fiber end grip 41 includes a fiber end placing stage 411 and a fiber end gripper 415. The fiber end placing stage 411 is a section on which the end portion of the optical fiber 1 is placed (placing stage). The fiber end gripper 415 is a member that grips the optical fiber 1 with the fiber end placing stage 411. In one or more embodiments of the present invention, the fiber end gripper 415 is provided so as to be openable and closable with respect to the body of the slide member 40 and includes a hinge section 415A, a fiber end holding section 415B, and an anchor claw section (refer to FIG. 3). The hinge section 415A is a coupling section that rotatably couples the fiber end gripper 415 with the body of the slide member 40. The fiber end holding section 415B is a member that comes into contact with the end portion of the optical fiber 1 placed on the fiber end placing stage 411 to hold the end portion of the optical fiber 1 with the fiber end placing stage 411. The anchor claw section is an anchor section that anchors to the body of the slide member 40 and is a section that fixes the fiber end gripper 415 in a closed state. The anchor claw section being anchored to the engagement hole 40A of the body of the slide member 40 to fix the fiber end gripper 415 in a closed state allows the end portion of the optical fiber 1 to be gripped between the fiber end placing stage 411 and the fiber end holding section 415B (the fiber end grip 41 to grip the end portion of the optical fiber 1).

The cut forming section 43 is a section that forms an initial cut in the optical fiber 1 and includes the blade 44 that forms an initial cut in the optical fiber 1. The cut forming section 43 is arranged to a rear side of the fiber end grip 41. The cut forming section 43 is arranged between the fiber grip 13 and the fiber end grip 41 in the front-rear direction. Hence, the cut forming section 43 forms an initial cut in the optical fiber 1 between the fiber grip 13 and the fiber end grip 41.

The cut forming section 43 includes the hinge section 43A, the blade 44, a blade holding section 43B, and the positioning pin 43C. The hinge section 43A is a coupling section that rotatably couples the cut forming section 43 with the body of the slide member 40. The blade 44 is a member (blade) that forms an initial cut in the optical fiber 1. The blade holding section 43B is a member for holding the blade 44 at the cut forming section 43. The positioning pin 43C is a section (blade-side positioning section) that comes into contact with the reference surface 24A of the positioning section 24 to perform front-rear direction positioning of the cut forming section 43 (blade 44). The positioning pin 43C is a section that protrudes from a lower surface of the cut forming section 43. In one or more embodiments of the present invention, since the cut forming section 43 is configured to be movable in the front-rear direction, the front-rear direction position of the cut forming section 43 (blade 44) at the time when the blade 44 comes into contact with the optical fiber 1 is aligned with the predetermined position by the positioning section 24 to prevent the position of forming an initial cut in the optical fiber 1 from being shifted in the front-rear direction.

The positioning pin 43C includes the columnar part 431C and the protrusion 432C (also refer to FIGS. 6A to 6C). The columnar part 431C is a part that is formed in a columnar shape (here, a square column shape) and that protrudes from the lower surface of the cut forming section 43. The columnar part 431C is configured to have a size of being able to pass through the first space 24B of the positioning section 24. The protrusion 432C is apart that protrudes outward compared with the columnar part 431C. Specifically, the protrusion 432C is apart that protrudes outward compared with the columnar part 431C in the left-right direction (direction perpendicular to the front-rear direction and the up-down direction). The protrusion 432C is configured to have a size wider than the first space 24B of the positioning section 24 and is not able (allowed) to pass through the first space 24B. In contrast, the protrusion 432C is configured to have a size narrower than the second space 24C and to be able (allowed) to pass through the second space 24C. With this, it is possible to perform positioning of the cut forming section 43 by the reference surface 24A of the positioning section 24 before cutting of the optical fiber 1 and also to move the cut forming section 43 toward the front side after cutting of the optical fiber 1.

Note that the fiber cutter 100 includes the latch section 50 (refer to FIGS. 1A to 1C) although not illustrated in FIG. 3. The latch section 50 is a section that latches the base member 10 and the slide member 40. The latch section 50 includes the base-side latch section 51 and the slide-side latch section 54. The base-side latch section 51 is a section that is provided to the base member 10 and that is in the form of a cantilever beam. The base-side latch section 51 comes into contact with the latch release section 23C of the operation section 23 and is elastically deformed. In this way, the base-side latch section 51 is unlatched from the slide-side latch section 54, to release the latch state. The slide-side latch section 54 is a section that is provided to the slide member 40 and that catches an end portion of the base-side latch section 51.

As has already been described, the tension application spring 60 is arranged between the base member 10 and the slide member 40. The tension application spring 60 is a member that applies force between the base member 10 and the slide member (tension application section) and applies tension to the optical fiber 1 gripped by the fiber grip 13 and the fiber end grip 41. An end (front end) of the tension application spring 60 is coupled with the base member 10 while the other end (rear end) of the tension application spring 60 is coupled with the slide member 40, and tension is applied to the tension application spring 60. With this, force of the tension application spring 60 can apply tension to the optical fiber 1 (bare optical fiber 1A), and also the slide member 40 can move relative to the base member 10.

Method for Cutting Optical Fiber 1 (Method for Using Fiber Cutter 100):

First, the operator sets the holder 3 on the holder placing section 11 of the base member 10 as illustrated in FIG. 3. Note that the optical fiber 1 to be cut is held by the holder 3. The optical fiber 1 extends from a front side of the holder 3, and the sheath of the corresponding end portion of the optical fiber 1 is removed in advance. Hence, the bare optical fiber 1A with the sheath removed is bridged from the fiber placing stage 131 of the base member 10 to the fiber end placing stage 411 of the slide member 40.

In one or more embodiments of the present invention, when the holder 3 (holder 3 holding the optical fiber 1 with the sheath removed at the end portion) is set on the holder placing section 11, the bare optical fiber 1A with the sheath removed is placed on the bare optical fiber placing section 131A as illustrated by the dotted lines in FIG. 5, and the portion of the optical fiber 1 with the sheath part 1B is placed on the sheath placing section 131B. In this way, the portions front and rear of the edge where the sheath of the optical fiber 1 is removed (stripping edge) are placed on the fiber placing stage 131.

In one or more embodiments of the present invention, in this stage (state where the fiber gripper 135 is opened), the restriction lid 22C of the restriction section 22 is in a state of closing the engagement hole 40A of the slide member 40 to restrict the catch pawl 415C of the fiber end grip 41 being engaged with the engagement hole 40A of the slide member 40. Hence, in one or more embodiments of the present invention, restriction is imposed on the fiber end grip 41 being closed before closing the fiber gripper 135. In this way, in one or more embodiments of the present invention, restriction is imposed on the fiber end grip 41 gripping the optical fiber 1 before the fiber grip 13.

Figure 4A:
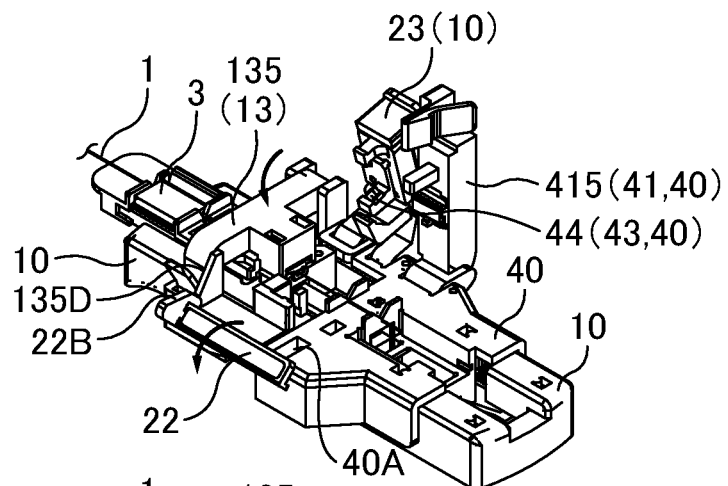
FIGS. 4A to 4D are explanatory diagrams illustrating states of the fiber cutter 100 according to one or more embodiments of the present invention.

Next, the operator closes the fiber gripper 135 as illustrated in FIG. 4A. When the fiber gripper 135 is closed, the optical fiber 1 is gripped between the fiber placing stage 131 and the fiber holding section 135B (in other words, the optical fiber 1 is gripped by the fiber grip 13). In one or more embodiments of the present invention, since the fiber holding section 135B is provided to be able to face the bare optical fiber placing section 131A (refer to FIG. 2A and FIG. 5), the fiber grip 13 results in gripping the bare optical fiber 1A with the sheath removed.

In one or more embodiments of the present invention, when the fiber gripper 135 is closed, the contact section 135D of the fiber gripper 135 comes into contact with the contacted section 22B of the restriction section 22 as illustrated in FIG. 4A, and consequently the restriction section 22 rotates (refer to FIG. 4A). When the restriction section 22 rotates, the engagement hole 40A of the slide member 40 is opened, the restriction on the fiber end grip 41 by the restriction section 22 is released, and this makes possible for the fiber end gripper 415 to be closed (for the fiber end grip 41 to grip the end portion of the optical fiber 1).

Figure 4B:
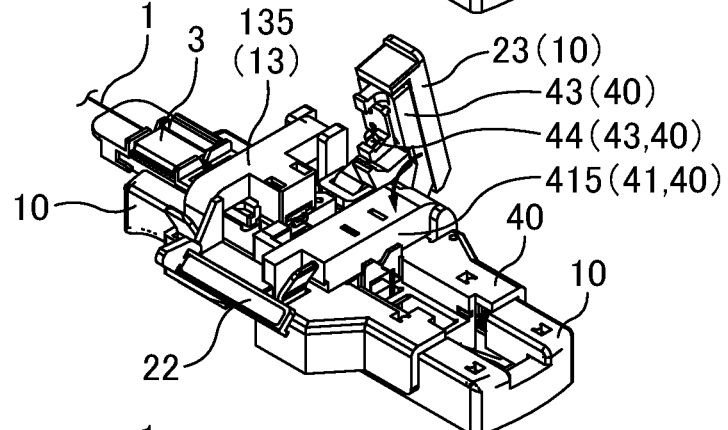

Next, the operator closes the fiber end gripper 415 as illustrated in FIG. 4B. When the fiber end gripper 415 is closed, the end portion of the optical fiber 1 is gripped between the fiber end placing stage 411 and the fiber end holder (the end portion of the optical fiber 1 is gripped by the fiber end grip 41). In one or more embodiments of the present invention, the bare optical fiber 1A is directly gripped by the fiber grip 13 and the fiber end grip 41 at both front and rear sides of the bare optical fiber 1A to be cut. Note that the state illustrated in FIG. 4B corresponds to the state illustrated in FIG. 1A.

Figure 4C:
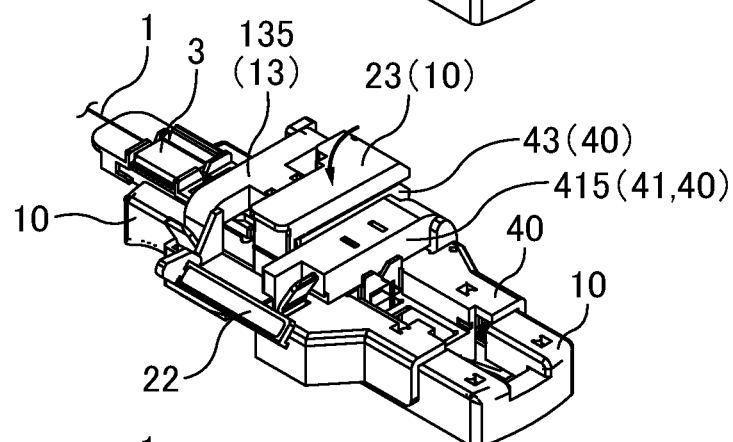

Next, the operator closes the operation section 23 (and the cut forming section 43) as illustrated in FIG. 4C. Note that the state illustrated in FIG. 4C corresponds to the state illustrated in FIG. 1B.

FIGS. 6A to 6C are explanatory diagrams illustrating states at the time when the operation section 23 is closed. In FIGS. 6A to 6C, the body of the slide member 40 and the fiber end grip 41 are not illustrated to illustrate the relationship between the positioning section 24 of the base member 10 and the positioning pin 43C of the cut forming section 43. As illustrated in FIGS. 6A to 6C, when the operation section 23 is rotated in the closing direction, the cut forming section 43 also rotates in the closing direction together with the operation section 23, and consequently the blade 44 of the cut forming section 43 moves in the direction of coming close to the optical fiber 1.

As illustrated in FIG. 6A, when the operation section 23 is rotated in the closing direction, the latch release section 23C member of the operation section 23 comes into contact with the base-side latch section 51. Moreover, when the operation section 23 is rotated in the closing direction, the base-side latch section 51 is unlatched from the slide-side latch section 54, to consequently release the latch state (refer to FIG. 1B). When the latch state is released, the force of the tension application spring 60 is applied between the base member 10 and the slide member 40, to thereby apply tension to the optical fiber 1 gripped by the fiber grip 13 of the base member 10 and the fiber end grip 41 of the slide member 40.

As illustrated in FIG. 6B, when the operation section 23 is further rotated in the closing direction, the protrusion 432C of the positioning pin 43C of the cut forming section 43 comes into contact with the reference surface 24A of the positioning section 24. In this way, the front-rear direction positioning of the cut forming section 43 with respect to the base member 10 is performed. Note that, in this stage, the protrusion 432C is positioned in the first space 24B, and, since the protrusion 432C is not able to pass through the first space 24B, a state in which the protrusion 432C of the positioning pin 43C is in contact with the reference surface 24A is maintained. Moreover, as illustrated in FIG. 6B, the protrusion 432C of the positioning pin 43C of the cut forming section 43 comes into contact with the reference surface 24A of the positioning section 24, before the blade 44 comes into contact with the optical fiber 1. In this way, the blade 44 comes into contact with the optical fiber 1 after the front-rear direction positioning of the cut forming section 43 with respect to the base member 10 is performed, and hence it is possible to form an initial cut at the predetermined position of the optical fiber 1.

When the operation section 23 is further rotated in the closing direction from the state illustrated in FIG. 6B, the blade 44 of the cut forming section 43 comes into contact with the optical fiber 1 to form an initial cut in the optical fiber 1. When the initial cut is formed in the optical fiber 1 with the tension being applied, the initial cut grows, so that the optical fiber 1 cleaves, and consequently the optical fiber 1 is cut.

Figure 4D:
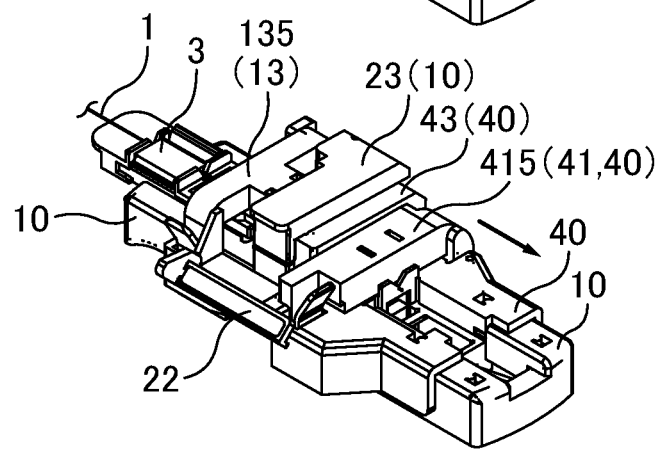

As illustrated in FIG. 6C, the protrusion 432C has reached the position of the second space 24C at the stage of cutting the optical fiber 1. Accordingly, when the optical fiber 1 cleaves and is then cut, the cut forming section 43 moves together with the slide member 40 as illustrated in FIG. 4D while the positioning pin 43C passes through the first space 24B and the second space 24C of the positioning section 24. Note that the state illustrated in FIG. 4D corresponds to the state illustrated in FIG. 1C. In the above-described embodiments, the fiber grip 13 grips the portion of the bare optical fiber 1A with the sheath removed (refer to FIG. 2A). Note that, however, the fiber grip 13 may indirectly grip the bare optical fiber 1A via the sheath part 1B instead of directly gripping the bare optical fiber 1A (may grip the covered portion of the optical fiber 1). Also with such a structure, the cut forming section 43 moves, when the optical fiber 1 cleaves, together with the slide member 40 as long as the cut forming section 43 is provided to the slide member 40, and it is hence possible to prevent contact of the cut surface of the optical fiber 1 and the blade 44 at the time when the optical fiber 1 gripped by the base member 10 is removed after cutting.

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMERALS

1: Optical fiber;
1A: Bare optical fiber;
1B: Sheath part;
3: Holder;
10: Base member;
11: Holder placing section;
13: Fiber grip;
131: Fiber placing stage;
131A: Bare optical fiber placing section;
131B: Sheath placing section;
131C: Step section;
135: Fiber gripper;
135A: Hinge section;
135B: Fiber holding section;
135C: Anchor claw section;
135D: Contact section;
21: Slide guide section;
22: Restriction section;
22A: Hinge section;
22B: Contacted section;
22C: Restriction lid;
22D: Torsion spring;
23: Operation section;
23A: Hinge section;
23B: Housing section;
231B: Pressing section;
23C: Latch release section;
24: Positioning section;
24A: Reference surface;
24B: First space;
24C: Second space;
40: Slide member;
40A: Engagement hole;
41: Fiber end grip;
411: Fiber end placing stage;
415: Fiber end gripper;
415A: Hinge section;
415B: Fiber end holding section;
415C: Catch pawl;
43: Cut forming section;
43A: Hinge section;
43B: Blade holding section;
43C: Positioning pin;
431C: Columnar part;
432C: Protrusion;
44: Blade;
50: Latch section;
51: Base-side latch section;
54: Slide-side latch section;
60: Tension application spring;
100: Fiber cutter.

The invention claimed is:

1. A fiber cutter comprising:
a base comprising a fiber grip for gripping an optical fiber;
a slider comprising a fiber end grip for gripping an end portion of the optical fiber, wherein the slider is movable relative to the base;
a cut former comprising a blade for forming an initial cut in the optical fiber, wherein the cut former is disposed between the fiber grip and the fiber end grip;
a spring that applies a force between the base and the slider for applying tension to the gripped optical fiber;
a latch unit that engages the base and the slider; and
a pressing body that releases the latch unit, wherein
the cut former is disposed on the slider, the pressing body moves the cut former to form the initial cut,
when the blade comes close to the optical fiber in order to form the initial cut in the optical fiber, the pressing body releases the latch unit and the spring applies the tension to the optical fiber, and
when the initial cut grows such that the optical fiber is cut through, the cut former moves relative to the pressing body and together with the slider by the force of the spring.

2. The fiber cutter according to claim 1, wherein:
the latch unit comprises a base-side engagement protrusion and a slider-side engagement recess,
upon being pressed, the pressing body pushes the base-side engagement protrusion apart from the slider-side engagement recess releasing engagement between the base-side engagement protrusion and the slider-side engagement recess, and
when the pressing body moves the cut former in a direction of forming the initial cut in the optical fiber, the pressing body releases the latch unit and the spring applies the tension to the optical fiber.

3. The fiber cutter according to claim 1, further comprising:
a restriction unit that restricts the fiber end grip from gripping the end portion of the optical fiber before the fiber grip grips the optical fiber.

4. The fiber cutter according to claim 3, wherein
when the fiber grip grips the optical fiber, the fiber grip contacts and moves the restriction unit and releases the fiber end grip from the restriction unit.

5. The fiber cutter according to claim 1, wherein
the cut former comprises a positioner that positions the cut former with respect to a reference surface of the base.

6. The fiber cutter according to claim 5, wherein
the positioner comprises a protrusion,
the reference surface of the base comprises a first space and a second space,
when the protrusion is positioned in the first space, the protrusion contacts the reference surface without passing through the first space and positions the cut former with respect to the base; and when the protrusion is positioned in the second space, the protrusion passes through the second space and the cut former moves together with the slider.

\* \* \* \* \*